UNITED STATES PATENT OFFICE.

MATTHEW ALBERT HUNTER, OF TROY, NEW YORK.

LOW-FREEZING LIQUID.

1,082,528.  Specification of Letters Patent.  Patented Dec. 30, 1913.

No Drawing.  Application filed August 8, 1913.  Serial No. 783,717.

*To all whom it may concern:*

Be it known that I, MATTHEW ALBERT HUNTER, a subject of the Kingdom of Great Britain, residing at Troy, in the county of Rensselaer and State of New York, have invented certain new and useful Improvements in Low - Freezing Liquids, of which the following is a specification.

My invention relates to liquids which will freeze only at a very low temperature, and the object of my invention is to provide a liquid which will be non-inflammable having a low vapor pressure which will freeze only at a very low temperature and which will mix with other liquids to prevent the same from freezing at low temperatures. I obtain this object by means of a liquid produced as hereinafter described.

It is found by experiment that carbon tetrachlorid ($CCl_4$) freezes at about 25° below zero on the centigrade scale and that carbon dichlorid ($C_2Cl_4$) freezes at about 15.5° below zero on the centigrade scale. By experiment I find that by mixing the two liquids together, using the carbon tetrachlorid as a base and adding carbon dichlorid until the mixture is 36% carbon dichlorid the freezing point is lowered in a regular manner until the temperature of 60.5° below zero on the centigrade scale is reached. This point is a "eutectic" mixture of $CCl_4$ and $C_2Cl_4$ and represents the lowest freezing mixture of the mixed liquids. On increasing the amount of carbon dichlorid beyond 36% the temperature at which the mixture freezes is constantly raised again in a regular manner until the liquid is practically pure carbon dichlorid which freezes at 15.5° below zero on the centigrade scale.

The mixture obtained by uniting the two liquids as above set forth has great utility where a liquid is required to withstand exceedingly low temperatures without changing into the solid state. It may be used for replacing the solution of brine or calcium chlorid in the ordinary processes of refrigeration. Also for replacing solutions of alcohol in hydraulic jacks operated out of doors in cold weather. Also for mixing with oils for electrical transformers used out of doors. A mixture of carbon tetrachlorid and carbon dichlorid unites perfectly with transformer oil giving a homogeneous mixture without subsequent separation of the component parts. A mixture of carbon tetrachlorid and carbon dichlorid may be used alone or with any of the oils now in use for that purpose. Such a mixture will increase the temperature range of operation. Such a mixture is also absolutely non-inflammable. Only under extraordinary conditions can either carbon tetrachlorid or carbon dichlorid be set on fire and the mixture as above set forth is non-inflammable. Also the mixture of carbon tetrachlorid and carbon dichlorid has a lower vapor pressure than tetrachlorid of carbon alone. When exposed to the ordinary temperature the evaporation of the mixture above described is much less than pure tetrachlorid of carbon alone.

What I claim as my invention and desire to secure by Letters Patent is,

1. A low freezing mixture composed of carbon tetrachlorid and carbon dichlorid.

2. A low freezing mixture composed of carbon tetrachlorid and carbon dichlorid mixed with another liquid, substantially as described for the purposes set forth.

In testimony whereof I affix my signature in presence of two witnesses.

MATTHEW ALBERT HUNTER.

Witnesses:
RETA VAN DER VOLGEN,
WALTER E. WARD.